(12) United States Patent
Klein

(10) Patent No.: US 11,295,018 B1
(45) Date of Patent: *Apr. 5, 2022

(54) FILE SYSTEM MODIFICATION

(71) Applicant: Twitter, Inc., San Francisco, CA (US)

(72) Inventor: Matthew D. Klein, Seattle, WA (US)

(73) Assignee: Twitter, Inc., San Francisco, CA (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/443,796

(22) Filed: Jun. 17, 2019

Related U.S. Application Data

(63) Continuation of application No. 15/688,601, filed on Aug. 28, 2017, now Pat. No. 10,325,096, which is a continuation of application No. 14/253,178, filed on Apr. 15, 2014, now Pat. No. 9,747,451.

(60) Provisional application No. 61/812,205, filed on Apr. 15, 2013.

(51) Int. Cl.
*G06F 21/57* (2013.01)

(52) U.S. Cl.
CPC .... *G06F 21/575* (2013.01); *G06F 2221/2105* (2013.01); *G06F 2221/2141* (2013.01)

(58) Field of Classification Search
None
See application file for complete search history.

(56) References Cited

U.S. PATENT DOCUMENTS

| 6,308,265 | B1 * | 10/2001 | Miller | G06F 11/1433 710/10 |
|---|---|---|---|---|
| 2009/0121028 | A1 * | 5/2009 | Asnaashari | G06F 21/79 235/492 |
| 2011/0093950 | A1 | 4/2011 | Bhargava et al. | |
| 2012/0151021 | A1 | 6/2012 | Bolay et al. | |
| 2014/0041053 | A1 | 2/2014 | Edwards et al. | |

* cited by examiner

*Primary Examiner* — Kim Huynh
*Assistant Examiner* — Joshua Neveln
(74) *Attorney, Agent, or Firm* — Fish & Richardson P.C.

(57) ABSTRACT

A system and method for message analysis, including: receiving, by a control service, a first modification request to modify a file system of a computing device, wherein the computing device is operating in a read-only state; identifying, by the control service, a request parameter associated with the first modification request; determining, by the control service, that the request parameter satisfies a permission criteria to perform the first modification request; provisioning, by the control service, the computing device to operate in a read/write state in response to determining that the permission criteria has been satisfied, wherein the first modification request is executed to modify the file system while the computing device is operating in the read/write state; and, upon a determination that the first modification request has successfully completed, provisioning, by the control service, the computing device to operate in the read-only state.

21 Claims, 13 Drawing Sheets

FILE SYSTEM MODIFICATION

CROSS-REFERENCE TO RELATED APPLICATIONS

This application is a continuation application of U.S. application Ser. No. 15/688,601, filed Aug. 28, 2017, which is a continuation application of U.S. application Ser. No. 14/253,178, filed Apr. 15, 2014, now U.S. Pat. No. 9,747,451, which claims the benefit of U.S. Provisional Application No. 61/812,205, filed on Apr. 15, 2013. The disclosure of the foregoing applications are all incorporated herein by reference in their entirety.

BACKGROUND

Computing devices are often configured for use by multiple users. For example, a computing device such as a file server can be used to maintain files that can be accessed by multiple users. With multiple users accessing a computing device, there is an increased probability that a file system of the computing device may be accidentally or maliciously modified by a user. Large datacenters can manage hundreds or thousands of such computing device and these modifications can result in divergence in the file systems across the computing devices, resulting in errors and overall entropy of the system.

SUMMARY

In general, in one aspect, the invention relates to a method for performing configuration changes. The method can include: receiving, by a control service, a first modification request to modify a file system of a computing device, wherein the computing device is operating in a read-only state; identifying, by the control service, a request parameter associated with the first modification request; determining, by the control service, that the request parameter satisfies a permission criteria to perform the first modification request; provisioning, by the control service, the computing device to operate in a read/write state in response to determining that the permission criteria has been satisfied, wherein the first modification request is executed to modify the file system while the computing device is operating in the read/write state; and, upon a determination that the first modification request has successfully completed, provisioning, by the control service, the computing device to operate in the read-only state.

In general, in one aspect, the invention relates to a method for performing configuration changes. The method can include: receiving, by a computing device, a first modification request to modify a file system of the computing device, wherein the computing device is operating in a read-only state; identifying, by the computing device, a request parameter associated with the first modification request; determining, by the computing device, that the request parameter satisfies a permission criteria to perform the first modification request; provisioning, by the computing device, to operate in a read/write state in response to determining that the permission criteria has been satisfied; executing, by the computing device, the first modification request while the computing device is operating in the read/write state; and, upon a determination that the first modification request has been successfully completed, provisioning, by the computing device, to operate in the read-only state.

In general, in one aspect, the invention relates to a method for performing configuration changes. The method can include: receiving, by a control service, a first modification request to modify a file system of a computing device, wherein the computing device is operating in a read-only state; identifying, by the control service, a request parameter associated with the first modification request; determining, by the control service, that the request parameter satisfies a permission criteria to perform the first modification request; and transmitting, by the control service and to the computing device, a provisioning command to operate in a read/write state, wherein the first modification request is executed to modify the file system while the computing device is operating in the read/write state.

Other aspects of the invention will be apparent from the following description and the appended claims.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Figure 1:
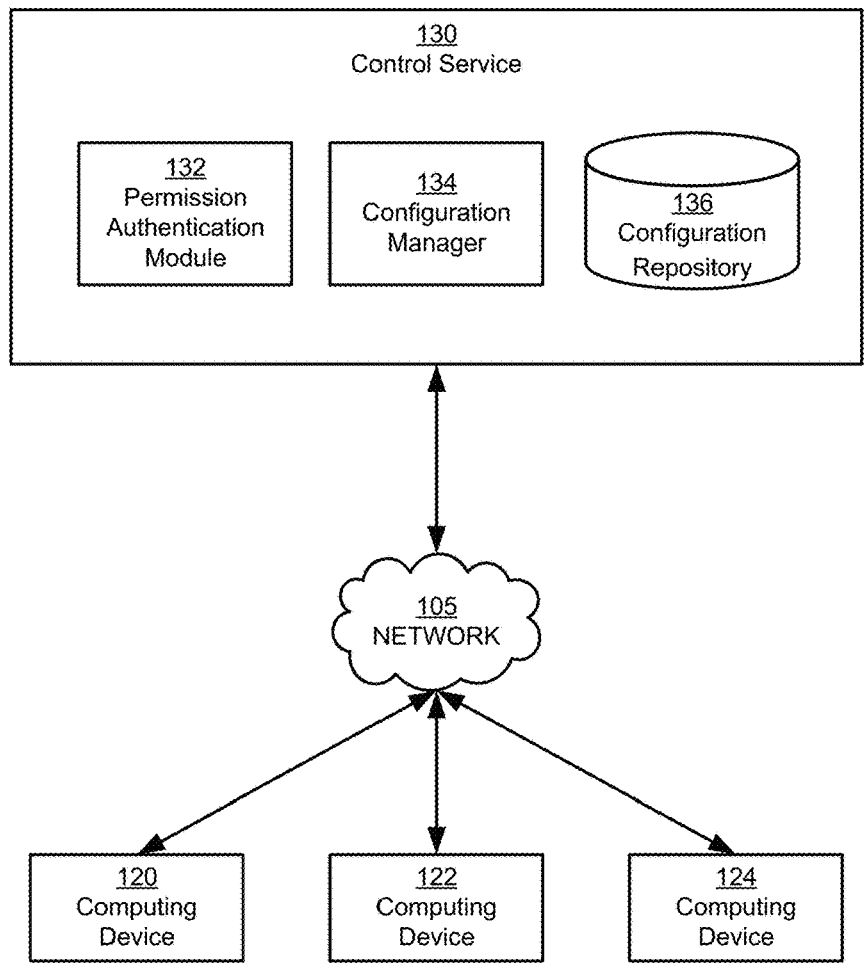
FIG. 1 shows a computing system in accordance with one or more embodiments of the invention.

A portion of the disclosure of this patent document may contain material that is subject to copyright protection. The copyright owner has no objection to the facsimile reproduction by anyone of the patent document or the patent disclosure, as it may appear in the Patent and Trademark Office patent file or records, but otherwise reserves all copyrights whatsoever.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention can be practiced without these specific details. In other instances, well-known features have not been described in detail to avoid unnecessarily complicating the description.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

In general, embodiments of the invention provide a method and system for performing configuration changes on a computing device. To prevent unwanted changes to the file system of a computing device, a control service can be configured to manage modification requests to modify the computing device. For example, a computing device can operate in a read-only state that does not allow changes to the file system. The control service can receive modification requests requesting to modify the file system of the computing device and determine whether to grant the modification request based on whether request parameters associated with the modification request satisfy a permission threshold to perform the modification request. If the control service determines that the permission threshold is satisfied, the control service can provision the computing device to operate in a read/write state, allowing the modification request to execute and modify the file system. After the modification request has successfully completed, the control service can provision the computing device to operate in the read-only state, preventing further changes to the computing device.

FIG. 1 shows a computing system 100 in accordance with one or more embodiments. As shown, multiple computing devices 120, 122, and 124 and a control service 130 can be communicatively coupled with a communication network 105 and configured to communicate with each other to send and receive data. In one or more embodiments, the computing devices 120, 122, and 124 are a network switch, a server, or any other type of computing device known in the art.

In one or more embodiments, the control service 130 includes functionality to manage configuration changes for a computing device 120. For example, in one or more embodiments, the control service 130 includes functionality to receive a modification request to modify a file system of a computing device 120. The computing device 120 can be operating in a read-only state to, for example, prevent unwanted changes to the file system of the computing device 120. In one or more embodiments, the control service 130 can receive the modification request from a computing device 120. Alternatively, in one or more embodiments, the control service 130 can receive the modification request locally, for example, from a user logged into the control service 130 either directly or remotely.

In one or more embodiments, the control service 130 includes functionality to identify a request parameter associated with the modification request. A request parameter can be any type of parameter, condition, etc., that describes the modification request.

In one or more embodiments, the request parameter is a directory of the file system to be modified, a file of the file system to be modified, an account identifier of an account that made the modification request, authentication data for an account that made the modification request, and a type of modification requested by the modification request, or any type of parameter, condition, etc., that describes or is associated with a modification request.

In one or more embodiments, the control service 130 can include a permission authentication module 132 that includes functionality to identify one or more request parameters from the modification request. For example, the computing device 120 can include functionality to include metadata describing the requested modification in the modification request. The permission authentication module 130 can gather the metadata included in the modification request to identify the request parameters associated with the modification request.

In one or more embodiments, the control service 130 can include functionality to determine that the request parameter satisfies a permission criteria to perform the modification request on the computing device 120. For example, the permission authentication module 132 can include functionality to identify appropriate permission criteria based on the modification request and the gathered request parameter(s). Permission criteria can define one or more conditions that must be met for a specified modification request to be approved, resulting in execution of the requested modification. For example, a permission criteria associated with modifying a specified file can be that the modification request be made by one of a specified group of requesting user accounts, thus limiting the ability to modify the specified file to the specified group of requesting user account. Requests to modify the specified file system that are made by user accounts not included in the specified group can be denied.

The control service 130 can include a configuration repository 136 including functionality to maintain a permission criteria index listing permission criteria for performing specified modifications. The permission authentication module 132 can include functionality to communicate with the configuration repository 136 to search the permission criteria index to identify the permission criteria associated with a received modification request. The permission criteria index can list permission criteria based on various type of request parameters. For example, permission criteria can be listed according to the computing device that will be modified, the directory to be modified, the file or file system to be modified, the type of modification requested, etc. The permission authentication module 132 can include functionality to search the permission criteria index based on the gathered request parameters to identify the permission criteria associated with a received modification request.

The permission authentication module 132 can determine whether the request parameter(s) satisfy the identified permission criteria to perform the modification request on the computing device 120. If the permission authentication module 132 determines that the request parameter(s) do satisfy the permission criteria, the permission authentication module 132 can grant the modification request. Conversely, if the permission authentication module 132 determines that the request parameter(s) do not satisfy the permission criteria, the permission authentication module 132 can deny the modification request.

In one or more embodiments, to determine that the request parameter satisfies the permission criteria to perform the modification request, the control service 130 includes functionality to determine that an account identified by an account identifier in the request parameter has authorization to perform a type of modification requested by the modification request. The permission criteria can be based on an account requesting to perform the modification request and/or the type of modification requested. For example, the permission authentication module 132 can include functionality to identify an account identifier identifying the user or user account that requested the modification. If the permission authentication module 132 determines that an account identified by an account identifier has authorization to perform the type of modification requested by the modification request, the permission authentication module 132 can grant the modification request.

In one or more embodiments, to determine that the request condition satisfies the permission criteria to perform the first modification request, the control service 130 includes functionality to determine that a type of modification requested by the modification request is permitted on a directory of the file system to be modified. The permission criteria can be based on the type of modification requested and/or the file system to be modified. For example, if the permission authentication module 132 determines that the type of modification requested by the modification request is permitted on a directory of the file system to be modified, the permission authentication module 132 can grant the modification request.

In one or more embodiments, to determine that the request condition satisfies the permission criteria to perform the first modification request, the control service 130 includes functionality to determine that an account identified by the modification request is authorized to modify a file. For example, the permission criteria can be based on the account requesting to perform the modification request and/or the file to be modified. If the permission authentication module 132 determines that an account identified by the modification request is authorized to modify a file, the permission authentication module 132 can grant the modification request.

In one or more embodiments, the control system 120 includes functionality to provision the computing device 120 to operate in a read/write state in response to determining that the permission criteria has been satisfied. For example, the control system 132 can include a configuration manager 134 that includes functionality to provision a computing device 120 to operate in a read/write state. Operating in the read/write state can allow the file system of the computing device 120 to be read and modified.

In one or more embodiments, the control service 130 includes functionality to transmit, to the computing device 120, a modification command to provision the computing device 120 to operate in the read/write state. The modification command can be a command instructing the computing device 120 to provision to operate in the read/write state. For example, in response to the permission authentication module 132 determining that a permission criteria to perform a modification request has been satisfied, the permission authentication module 132 can notify the configuration manager 134 to provision the computing device 120 to operate in a read/write state.

The computing device 120 can provision to operate in the read/write state upon receiving the modification command. Provisioning can include any type of function or process to initiate or alter the state of the computing device 120. In one or more embodiments, provisioning can include receiving, installing, and/or altering an operating system. In one or more embodiments, provisioning can include allocating resources. For example, provisioning can allocate physical resources such as networking, memory, processing and power resources. In one or more embodiments, provisioning can include allocating an IP address or bandwidth. In one or more embodiments, provisioning can include provisioning software or installing software.

In one or more embodiments, provisioning can include reconfiguring the computing device 120. For example, provisioning can include reconfiguring the computing device 120 by modifying configurations of the computing device 120, such as configuration files of the computing device 120. Alternatively, provisioning can include reconfiguring the computing device 120 to modify the IP address, bandwidth, permissions, etc. of the computing device 120.

In one or more embodiments, the control service 120 can include functionality to transmit, to the computing device 120, a cold-boot provisioning command, where the cold-boot provisioning command causes the computing device 120 to reboot. In response to the cold-boot provisioning command, the computing device 120 can boot into a read/write provisioning state.

Alternatively, in one or more embodiments, the control service 120 can include functionality to transmit, to the computing device 120, a live provisioning command. A live provisioning command can provision the computing device 120 to operate in the read/write state without rebooting. In response to the live provisioning command, the computing device 120 may continue to service requests while provisioning to operate in the read/write state, and/or may continue to service requests while the modification request is executed.

In one or more embodiments, the computing device 120 continues to service requests while in the read/write state. For example, the computing device 120 can continue to receive service requests from one or more remote computing devices 122, 124, and/or locally from a user logged into computing device 120. As a result, the computing device 120 may continue to service modification requests while operating in the read/write state.

In one or more embodiments, provisioning the computing device 120 to operate in the read/write state can include provisioning a portion of the file system that will be modified by the modification request to operate in the read/write state. For example, a portion of the computing device 120 can be operating in the read-only state, while a portion of the computing device 120 can be operating in the read/write state. As a result, a higher protection of portions of the file system of the computing device can be achieved, while allowing other portions to be modified. Each portion of the computing device 120 can refer to a portion of the file system on a disk, a logical segmentation based on a grouping of applications, or any other allocation of permissions. For example, the permissions for a file used to store network settings may be changed to a read/write state in order to execute a modification request involving the file. Meanwhile, other operating system files that are unrelated to the modification request may be left in a read-only state Rather than provision the entire file system of the computing device 120 to operate in the read/write state, the portion of the file system that will be modified by the modification request can be provisioned, while other portions that will not be modified by the modification request can remain operating in the read-only state. As a result, further protection can be provided to the file system of the computing device 120.

In one or more embodiments, the modification request is executed to modify the file system while the computing device 120 is operating in the read/write state. The modification command can further instruct the computing device 120 to execute the modification request and modify the file system of the computing device 120. For example, the modification command can instruct the computing device 120 to cold-boot provision and execute the modification request upon booting in the read/write provisioning state. Alternatively, the modification command can instruct the computing device 120 to live provision to operate in the read/write state without rebooting the system, upon which the computing device 120 can execute the modification request.

In one or more embodiments of the invention, the control service 130 includes functionality to, upon a determination that the modification request has successfully completed, provision the computing device 120 to operate in the read-only state. For example, the computing device 120 can notify the control service 130 that the modification request has been executed. The control service 130 can then provision, send a command to provision, the computing device 120 to operate in the read-only state in response to receiving the notification indicating that the modification request has successfully completed.

In one or more embodiments, the control service 130 includes functionality to cold-boot provision the computing device 120 to operate in the read-only state by transmitting, to the computing device 120, a modification command to reboot the computing device 120. By rebooting, the computing device 120 can cause itself to boot into a read/write provisioning state, during which the computing device 120 can execute the modification request. For example, the modification command transmitted by the configuration manager 134 to the computing device 120 can be a reboot command instructing the computing device to reboot. Upon receiving the reboot command, the computing device 120 can reboot.

In one or more embodiments, the control service 130 includes functionality to log an execution of a modification request to modify the file system of the computing device 120. For example, the configuration repository 136 can maintain a configuration log and the configuration manager 134 can include functionality to communicate with the configuration repository 136 to edit the configuration log to log an execution of a modification request to modify the file system of a computing device 120.

In one or more embodiments, the control service 130 includes functionality to receive one or more other modification requests to modify the file system of the computing device 120, where the computing device 120 is operating in the read-only state. The control service 130 can receive the one or more other modification requests from a computing device 120. Alternatively, in one or more embodiments, the control service 130 can receive the one or more other modification requests locally, for example, from a user logged into the control service 130 either directly or remotely.

In one or more embodiments, the control service 130 includes functionality to identify a request parameter associated with the one or more other modification requests. For example, the control service 130 can gather the request parameter from metadata included in the one or more other modification requests.

In one or more embodiments, the control service 130 includes functionality to determine that the request parameter does not satisfy the permission criteria to perform the one or more other modification requests. For example, the permission authentication module 132 can gather the appropriate permission criteria from the configuration repository to determine that the permission criteria is not satisfied.

In one or more embodiments, the control service 130 includes functionality to deny the one or more other modification requests. For example, if the control service 130 received a modification request from the computing device 120, the control service 130 can transmit a command to the computing device 120 that the requested modification has been denied. Accordingly, the computing device 120 can remain operating in the read-only state and the requested modification will not be executed.

In one or more embodiments, the functionality to manage configuration changes as described with respect to the control service 130 can be implemented locally in a computing device 120 rather than in a network-based configuration as shown in FIG. 1. For example, the computing device can include functionality to receive a modification request to modify a file system of the computing device 120, for example, from a user accessing the computing device 120 directly or remotely using a remote computing device 122. The computing device 120 can be operating in a read-only state to prevent unwanted changes to the file system.

The computing device 120 can identify a request parameter associated with a modification request. For example, the request parameter can identify the type of modification requested, a directory to be modified, a file or file system to be modified, an account identifier identifying the requesting user or user account, the time the modification request was received, the computing device to be modified, a remote computing device requesting to perform the modification, authentication data for the requesting user or user account, and/or any other type of parameter.

The computing device 120 can also include functionality to determine whether the the request parameter satisfies a permission criteria to perform the modification request. For example, the computing device 120 can include a local database including functionality to maintain a permission criteria index listing permission criteria for performing specified modifications. The computing device 120 can identify the appropriate permission criteria from the permission criteria index.

The computing device can further determine whether the request parameter(s) satisfy the identified permission criteria to perform the modification request on the computing device

120. If the computing device 120 determines that the request parameter(s) do satisfy the permission criteria, the permission authentication module 132 can grant the modification request. Conversely, if the permission authentication module 132 determines that the request parameter(s) do not satisfy the permission criteria, the permission authentication module 132 can deny the modification request.

In response to determining that the permission criteria has been satisfied, the computing device 120 can provision to operate in a read/write state, thus enabling the modification request to be executed. In one or more embodiments, the computing device 120 can provision itself to operate in the read/write state by rebooting, resulting the computing device booting up in a read/write provisioning state, during which the computing device 120 can execute the modification request.

Alternatively, the computing device 120 can provision to operate in the read/write state without rebooting. The computing device can then execute the modification request while the computing device 120 is operating in the read/write state.

Upon a determination that the modification request has been successfully completed, the computing device 120 can again provision to operate in the read-only state. In one or more embodiments, the computing device 120 can provision to operate in the read-only state by rebooting the computing device 120. Alternatively, in one or more embodiments, the computing device 120 can provision to operate in the read-only state without rebooting.

A modification request can be any type of request to modify the computing device 120. For example, in one or more embodiments, the modification request can be a request to install software on the computing device 120 received from a remote computing device 122. To execute the modification request, the computing device can download the software from the remote computing device 122 and install the software on the computing device. Alternatively, the computing device 120 can receive the modification request locally as a result of a user interacting directly with the computing device 120. The computing device 120 can either download the software from a remote computing device 120 or, alternatively, install it from a local drive of the computing device 120.

Although the components of system 100 are depicted as being directly communicatively coupled to one another, this is not necessarily the case. For example, one or more of the components of system 100 may be communicatively coupled via a distributed computing system, a cloud computing system, or a networked computer system communicating via the Internet.

Although only one control service 130 is illustrated, it should be appreciated that this one service may represent many computer systems, arranged in a central or distributed fashion, for example, such computer systems may be organized as a central cloud and/or may be distributed geographically or logically to edges of a system such as a content delivery network or other arrangement.

Figure 2A:
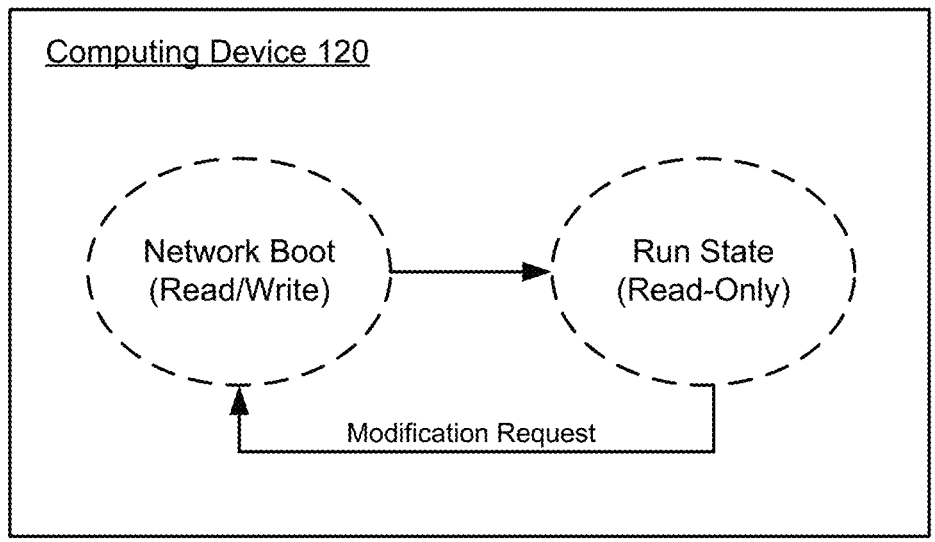
FIG. 2A shows an example of various states and components of a computing device in accordance with one or more embodiments of the invention.

FIG. 2A shows an example of various operating states of a computing device 120. In the example of FIG. 2A, the computing device 120 includes functionality to receive a modification request (e.g., from an administrator, software component, or other entity) while operating in a read-only state. In response to the modification request, the computing device 120 can perform a reboot operation (e.g., a network boot). The reboot operation can cause the computing device 120 to provision to operate in a read/write state, during which the computing device 120 can implement one or more requested modification(s) (e.g., configuration modification, operating system modification, file system modification, and/or etc.). By performing the reboot operation, the computing device 120 can become temporarily disabled, which can lead to an interruption of execution of services by the computing device 120.

Figure 2B:
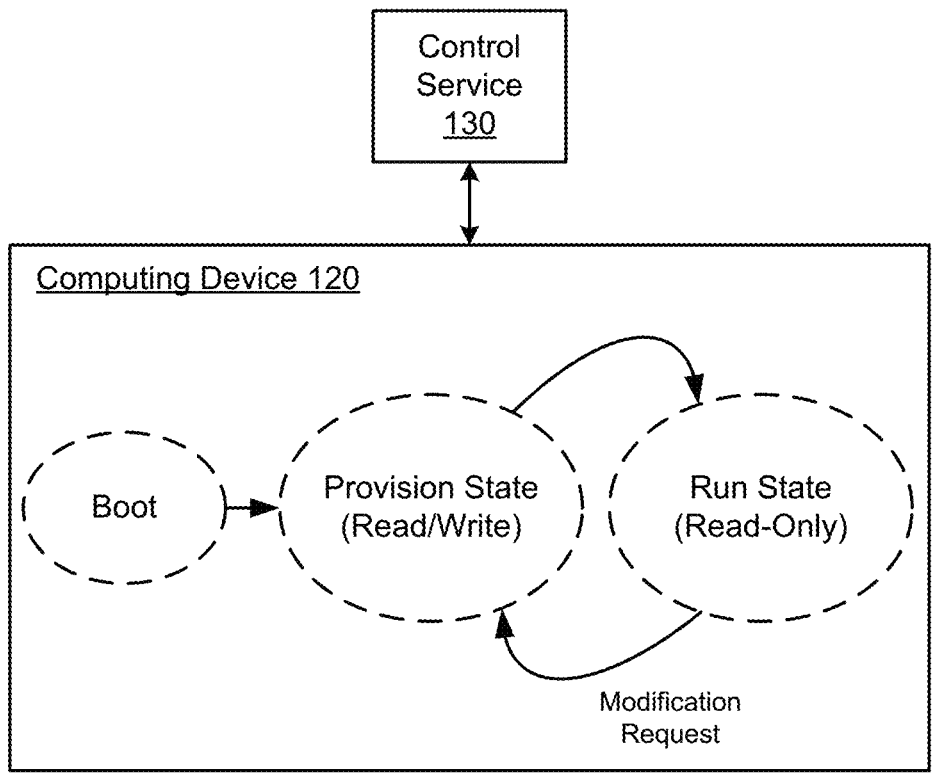
FIG. 2B shows an example of a computing device 120 and a remote control service in accordance with one or more embodiments of the invention.

FIG. 2B shows an example of a computing device 120 and a remote control service 130. The control service 130 can include functionality to receive a modification request (e.g., from an administrator, software component, or other entity) while the computing device 120 is operating in a read-only state. The control service 130 can serve as a remote intermediary service including functionality to manage modification requests by controlling access and permissions, and by logging changes across any number of connected computing devices (e.g., computing devices 122 and 124).

In response to the authorization of a modification request by the control service 130, the control service 130 can cause the computing device 120 to operate in a read/write state to execute the requested modification and concurrently continue to execute relevant services. After the computing device 120 performs the requested modification, the modifications can be logged by the control service 130 and the computing device 120 can be provisioned to operate in the read-only state. In this example, the process of performing the aforementioned modification does not necessarily require a reboot or interruption of executing services.

Figure 3:
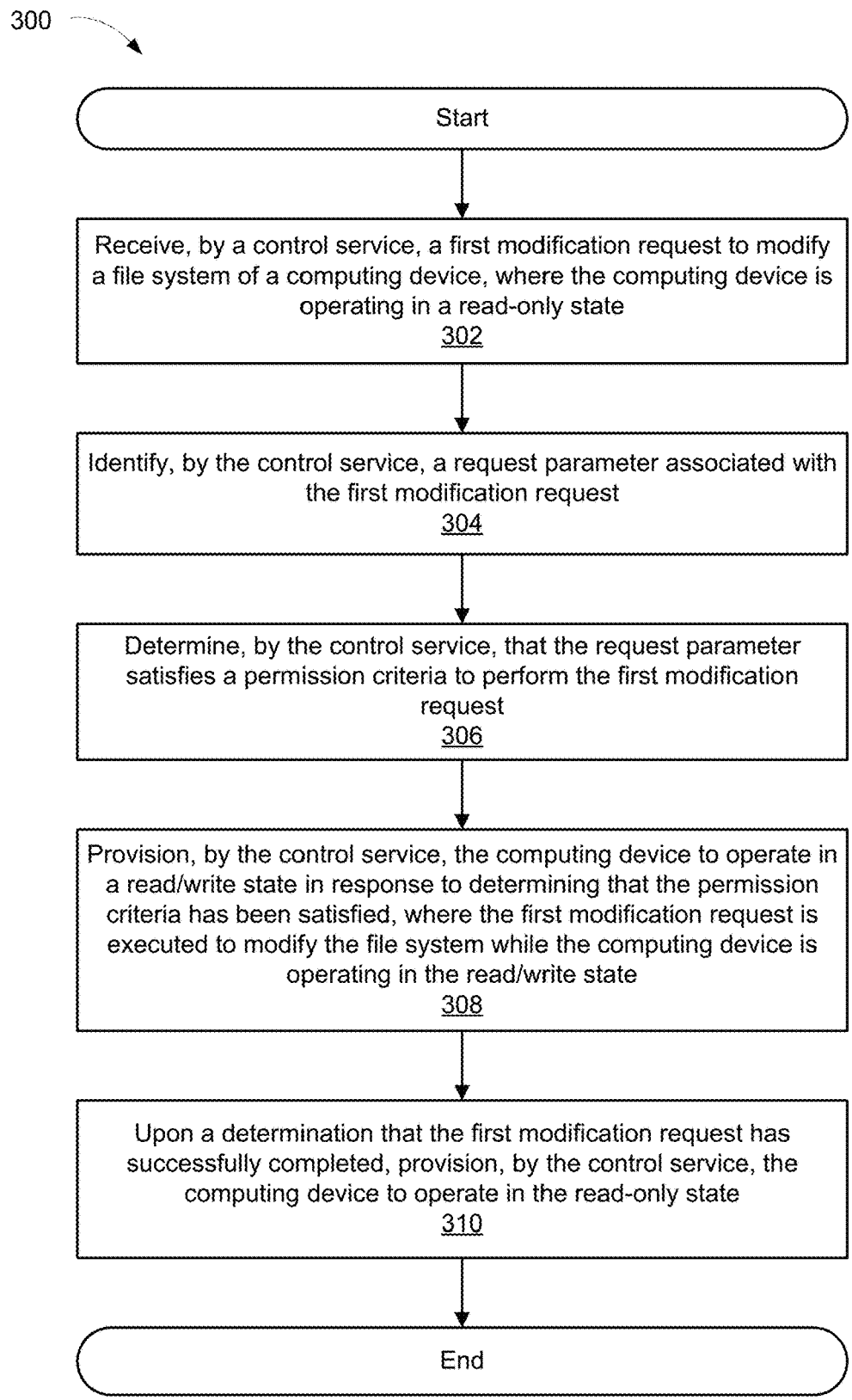
FIG. 3 shows a flowchart in accordance with one or more embodiments of the invention.

FIG. 3 shows a flowchart of a method 300 for performing configuration changes on a computing device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 3 should not be construed as limiting the scope of the invention.

In STEP 302, a first modification request to modify a file system of a computing device is received, where the computing device is operating in a read-only state. For example, the modification request can be a request to install software on the computing device, modify a file of the computing device, modify a directory of the computing device, etc. To avoid unwanted modifications to the computing device, the computing can be operating in a read only state that enables file on the computing device to be read, but not modified.

In STEP 304, a request parameter associated with the first modification request is identified. A request parameter can be any type of parameter, condition, etc., that describes the modification request. For example, a request parameter can identify the type of modification requested, a directory to be modified, a file or file system to be modified, an account identifier identifying the requesting user or user account, the time the modification request was received, the computing device to be modified, a remote computing device requesting to perform the modification, authentication data for the requesting user or user account, and/or any other type of parameter.

In one or more embodiments, the request parameter can be identified from the modification request. For example, the computing device can include metadata describing the requested modification in the modification request. The metadata included in the modification request can then be gathered to identify the request parameters associated with the modification request.

In STEP 306, it is determined that the request parameter satisfies a permission criteria to perform the first modification request. Permission criteria can define one or more conditions that must be met for a specified modification request to be approved, resulting in execution of the requested modification. For example, a permission criteria associated with modifying a specified file can be that the modification request be made by one of a specified group of requesting user accounts, thus limiting the ability to modify the specified file to the specified group of requesting user accounts. Requests to modify the specified file system that are made by user accounts not included in the specified group can be denied.

In one or more embodiments, the permission criteria for the modification request can be gathered from a permission criteria index that lists the permission criteria for various modification requests. The permission criteria index can list permission criteria based on various types of request parameters. For example, permission criteria can be listed according to the computing device that will be modified, the directory to be modified, the file or file system to be modified, the type of modification requested, etc.

The request parameters can be used to determine whether the identified permission criteria is satisfied. In one or more embodiments, the permission criteria can be based on an account requesting to perform the modification request and/or the type of modification requested. For example, the permission criteria can include a list of the account identifiers that are authorized to perform the modification request. A request parameter, such as an account identifier, that identifies the user or user account that requested to make the modification can be compared to the permission criteria listing the authorized account identifier to determine whether the permission criteria is satisfied.

In one or more embodiments, the permission criteria can be based on the type of modification requested and/or the file system to be modified. For example, the permission criteria can identify the types of modifications authorized on a file system. Request parameters identifying the file system to be modified can be used to determine whether the permission criteria is satisfied (e.g., the requested modification is authorized on the specified file system).

In one or more embodiments, the permission criteria can be based on the account requesting to perform the modification request and/or the file to be modified. For example, if it is determined that an account identified by the modification request is authorized to modify a file, the modification request can be granted.

In STEP 308, the computing device is provisioned to operate in a read/write state in response to determining that the permission criteria has been satisfied, where the first modification request is executed to modify the file system while the computing device is operating in the read/write state. Provisioning the computing device to operate in the read/write state allows the file system of the computing device to be read as well as modified, thus enabling execution of a modification request.

In one or more embodiments, a modification command can be transmitted to the computing device, which causes the computing device to provision to operate in the read/write state. The modification command can further instruct the computing device to execute the modification request and modify the file system of the computing device. Upon receiving a modification command, the computing device can provision itself to operate in the read/write state, and while in the read/write state, execute the modification request.

In one or more embodiments, the computing device can provision itself to operate in the read/write state by rebooting, causing the computing device to boot up in a read/write provisioning state, during which the modification request can be executed. For example, the modification command transmitted to the computing device can be a reboot command instructing the computing device to reboot.

Alternatively, in one or more embodiments, the computing device can provision itself to operate in the read/write states without rebooting the system. This can allow the computing device to continue to service modification requests while operating in the read/write state.

In STEP 310, upon a determination that the first modification request has successfully completed, the computing device is provisioned to operate in the read-only state. In one or more embodiments, the computing device can be provisioned to operate in the read-only state by rebooting. Alternatively, in one or more embodiments, the computing device can be provisioned to operate in the read-only state without rebooting.

Figure 4:
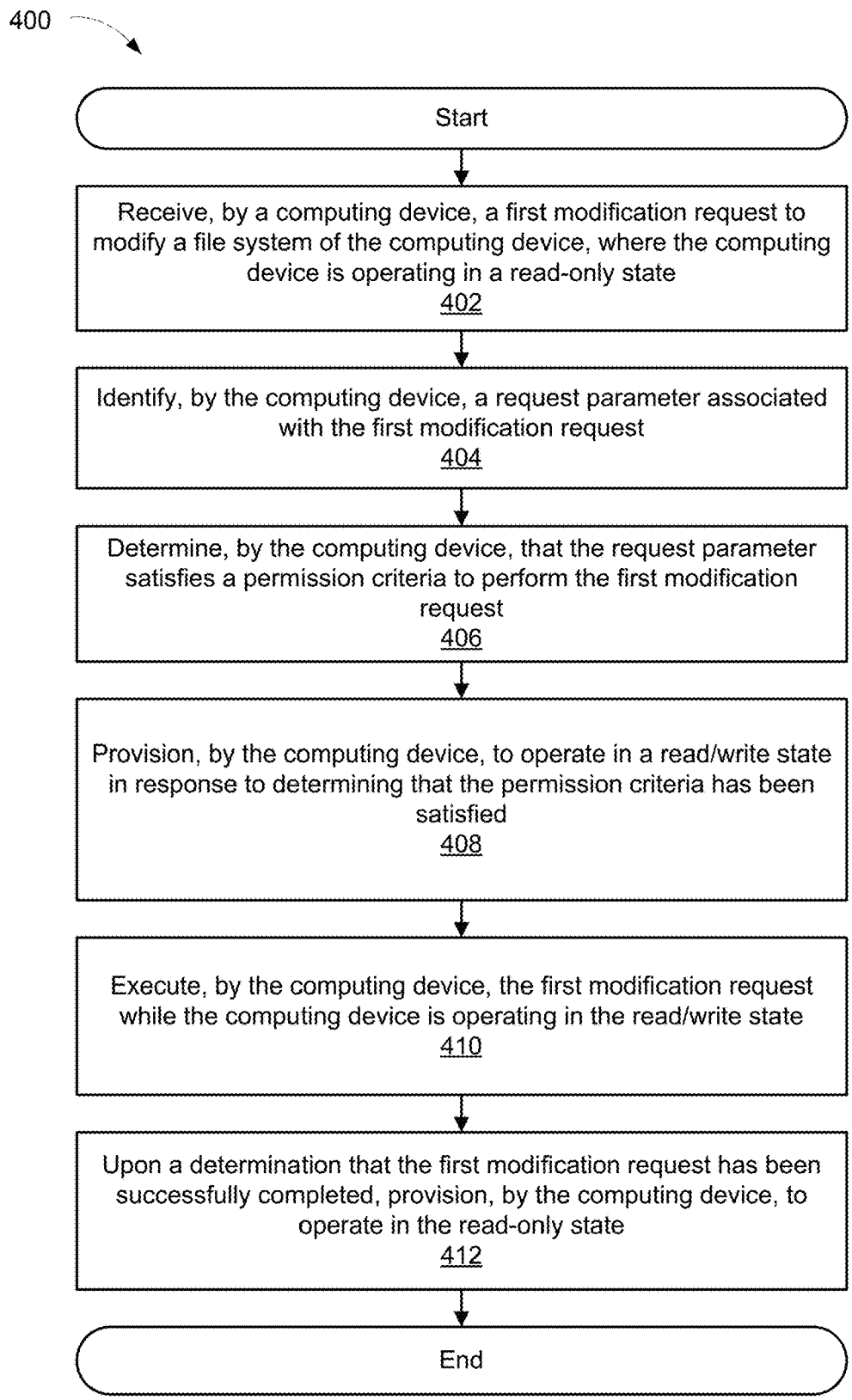
FIG. 4 shows a flowchart in accordance with one or more embodiments of the invention.

FIG. 4 shows a flowchart of a method 400 for performing configuration changes on a computing device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 4 should not be construed as limiting the scope of the invention.

In STEP 402, a first modification request to modify a file system of the computing device is received, where the computing device is operating in a read-only state. The modification request can be a request to make any type of modification to the file system of the computing device. For example, the modification request can be a request to change a directory or file on the computing device. Alternatively, the modification request can be a request to install software on the computing device.

In STEP 404, a request parameter associated with the first modification request is identified. A request parameter can by any type of parameter or condition describing the recommended request. For example, the request parameter can identify the requesting user or user account, a file of directory to be modified, software to be installed, etc. In one or more embodiments, the request parameter can be identified from metadata included in the modification request.

In STEP 406, it is determined that the request parameter satisfies a permission criteria to perform the first modification request. A permission criteria can define one or more conditions that must be met to perform a requested modification. The identified request parameter can be used to determine whether the permission criteria is satisfied. For example, a permission criteria can define a set of users authorized to perform a specified modification. A request parameter identifying the requesting user can be compared to the permission criteria defining the authorized users to determine whether the permission criteria is satisfied. If the requesting user is included in the set of users authorized to perform the specified modification, it can be determined that the request parameter satisfies the permission criteria to perform the requested modification.

In STEP 408, the computing device is provisioned to operate in a read/write state in response to determining that the permission criteria has been satisfied. Provisioning to operate in the read/write state can allow the requested modification to be executed. In one or more embodiments, the computing device can be provisioned to operate in the read/write state by rebooting the computing device, causing the computing device to boot up in a read/write provisioning state. Alternatively, the computing device can provision to operate in the read/write state without rebooting, which can allow the computing device to continue to service requests.

In STEP 410, the first modification request is executed while the computing device is operating in the read/write state. For example, the requested modification to the file system can be executed while the computing device operates in the read/write state. This can include modifying a file or directory, installing software, etc.

In STEP 412, upon a determination that the first modification request has been successfully completed, the computing device is provisioned, to operate in the read-only state. Provisioning of the computing device to operate in the read only state can provide protection against unwanted modifications to the file system of the computing device.

Figure 5:
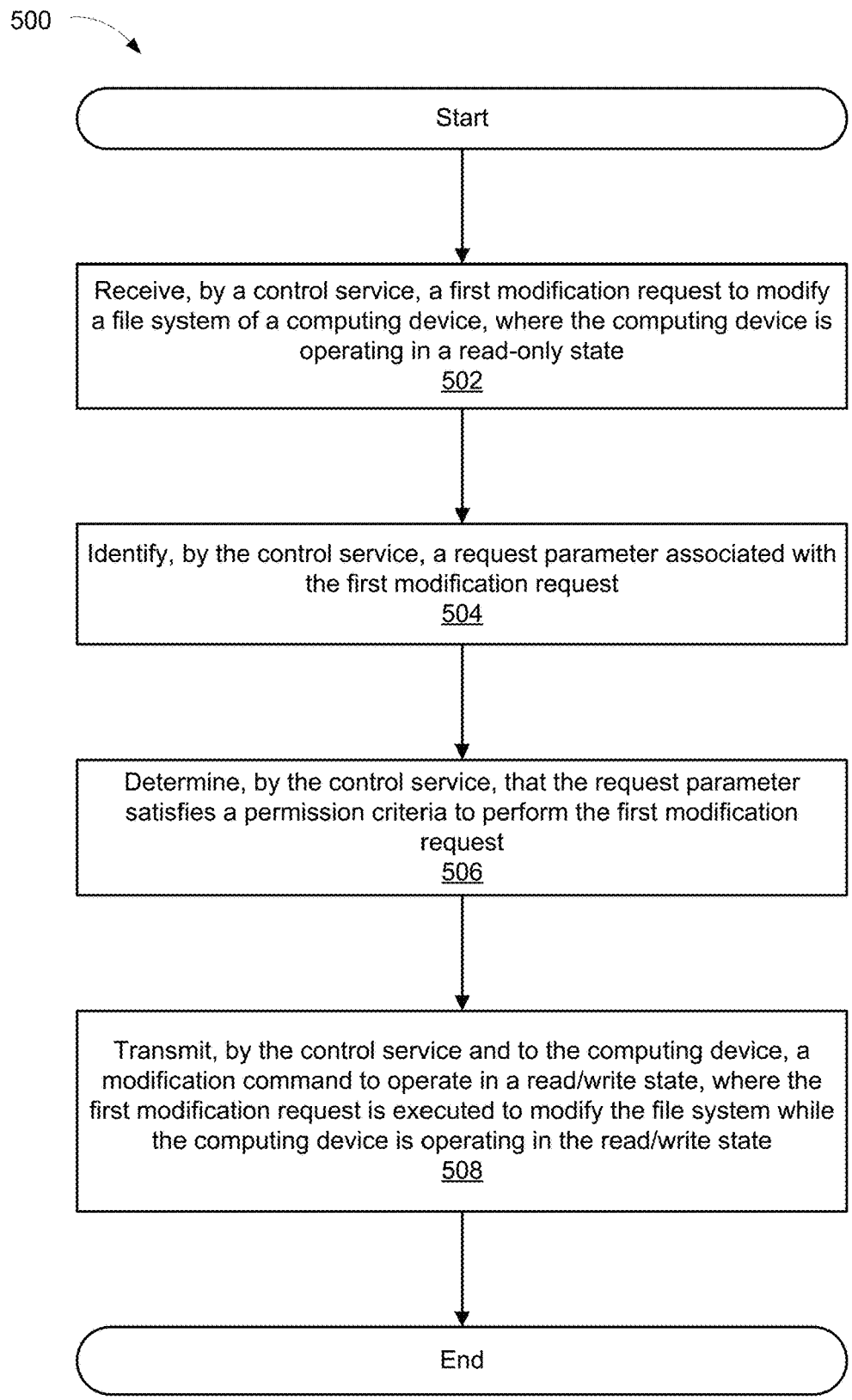
FIG. 5 shows a flowchart in accordance with one or more embodiments of the invention.

FIG. 5 shows a flowchart of a method 500 for performing configuration changes on a computing device. While the various steps in this flowchart are presented and described sequentially, one of ordinary skill will appreciate that some or all of the steps can be executed in different orders and some or all of the steps can be executed in parallel. Further, in one or more embodiments, one or more of the steps described below can be omitted, repeated, and/or performed in a different order. Accordingly, the specific arrangement of steps shown in FIG. 5 should not be construed as limiting the scope of the invention.

In STEP 502, a first modification request to modify a file system of a computing device is received, where the computing device is operating in a read-only state. The modification request can be a request to perform any type of modification to the file system of the computing device, such as modifying a file or directory, installing software, etc. To prevent unwanted modifications, the computing device can be operating in a read-only state, which allows the file system of the computing device to be read, but not modified.

In STEP 504, a request parameter associated with the first modification request is identified. A request parameter can by any type of parameter or condition describing the recommended request. For example, the request parameter can identify the requesting user or user account, a file of directory to be modified, software to be installed, etc. In one or more embodiments, the request parameter can be identified from metadata included in the modification request.

In STEP 506, it is determined that the request parameter satisfies a permission criteria to perform the first modification request. A permission criteria can define one or more conditions that must be met to perform a requested modification. The identified request parameter can be used to determine whether the permission criteria is satisfied. For example, a permission criteria can define a set of users authorized to perform a specified modification. A request parameter identifying the requesting user can be compared to the permission criteria defining the authorized users to determine whether the permission criteria is satisfied. If the requesting user is included in the set of users authorized to perform the specified modification, it can be determined that the request parameter satisfies the permission criteria to perform the requested modification.

In STEP 508, a modification command to operate in a read/write state, is transmitted to the computing device, wherein the first modification request is executed to modify the file system while the computing device is operating in the read/write state. The modification command can be a command instructing a computing device to provision to operate in a specified state identified by the modification command. For example, a modification command can instruct a computing device to operate in a read/write or read only state. The modification command can cause a receiving computing device to provision to operate in the specified state upon receiving the modification command. In one or more embodiments, a modification command can cause a computing device to reboot to provision to operate in a specified state. For example, a modification command instructing a computing device running in a read-only state to provision to operate in a read/write state can cause the computing device to reboot. Rebooting the computing device can cause the computing device to boot in a read/write provisioning state, during which, modifications to the file system of the computing device can be executed.

One or more embodiments of the invention streamline the process by which machines in datacenters are provisioned and operated by booting the host operating system over the network versus via a set of one or more previously provisioned boot disks. One or more embodiments of the present invention can yield significant cost savings, both by reducing outright capital expenditure on hardware, but also by decreasing the indirect operational burden that comes along with the use of physical disk(s) as the boot mechanism. Cost saving avenues may include datacenter operation and hardware costs (e.g., removal of the boot disk(s) from server BOM costs, removal of the operational costs of servicing defective boot disks during a server's lifecycle, etc).

Company-wide engineering efficiency gains may include decreased fleet software entropy via effectively re-imaging machines each time they are booted. (Additional anti-entropy protection such as a mostly read-only root partition may be also optionally available). Re-imaging may be guaranteed to be completely clean in cases where there are no boot disk(s) that have the potential to be left in an indeterminate state by previous attempts. Further, permanently corrupted and unrecoverable root file systems may be no longer possible due to hardware, power failure, or software bug. There may be increased security due to decreased fleet entropy. There may be increased kick-start/rebuild speed allowing for more dynamic machine re-provisioning. In addition, there may be simplifications of certain configuration management workflows such as kernel upgrades (e.g., a reboot is used for most major configuration changes, thus relieving an external configuration management service of performing these tasks as well as using the reboot as a forced anti-entropy prevention measure).

One or more embodiments of the invention may include removing all or some boot disks from all or some production machines in datacenters (the tier zero services (e.g., DHCP, PXE, etc.) that are part of the core infrastructure may continue to have boot disks and a kick-start mechanism to provision them. As a result, a very small portion of machines using a special version of a boot workflow that is not susceptible to deadlock during DC restart may exist. This is discussed in more detail later in the document.). One or more embodiments of the invention provide operating system (OS) distribution updates via image update and reboot versus configuration steps from an external configuration management service. One or more embodiments of the invention provide a reasonable migration path for data currently stored within the root partition (e.g., temporary files, logging data, etc.).

One or more embodiments of the invention may not include removing all disks from all machines (machines that provide storage and database services may continue to need disks, as will developer machines, etc.). One or more embodiments of the invention may not include significantly changing how service configuration management is performed (an external configuration management service can continue to be used at the discretion of service owners and SRE).

Figure 6:
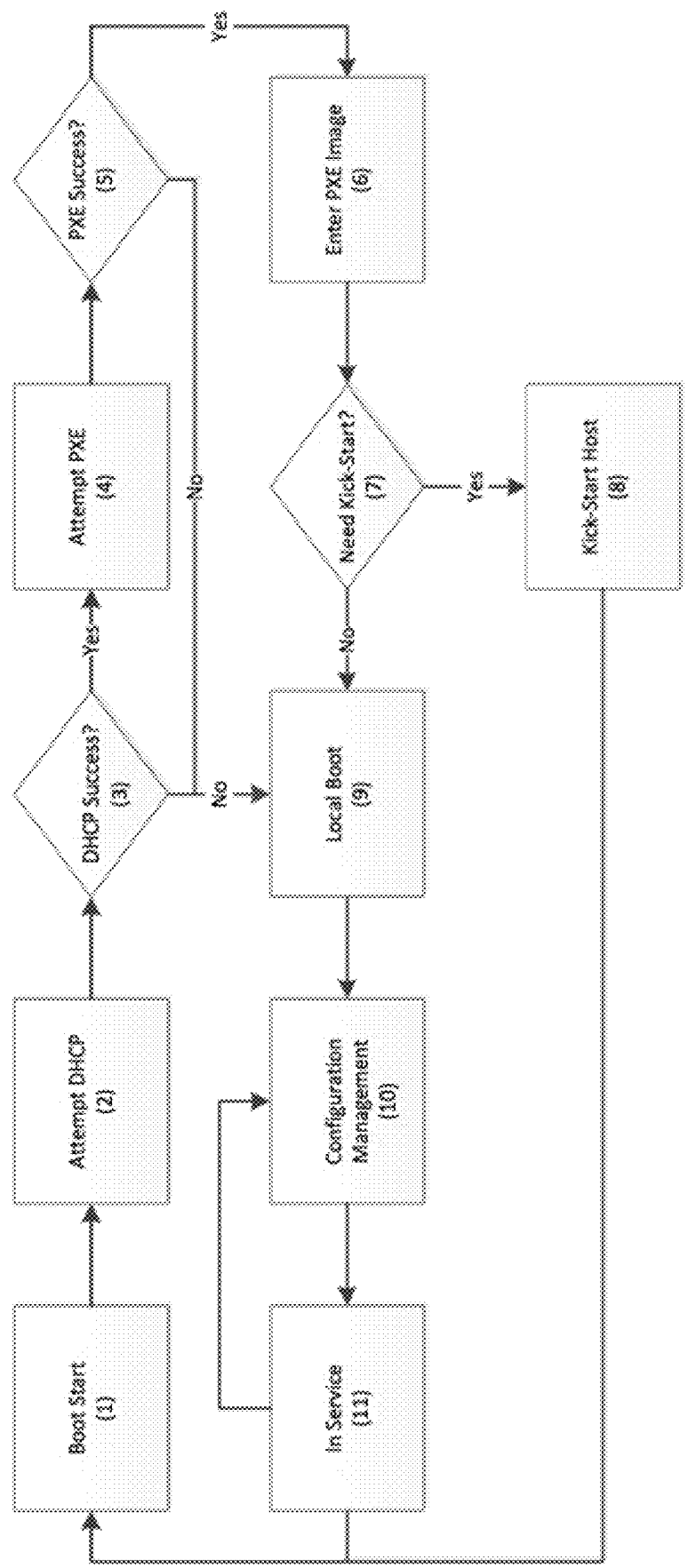
FIG. 6 shows a boot and provisioning process, according to embodiments of the present invention.

FIG. 6 shows a boot and provisioning process, according to embodiments of the present invention. A brief discussion of each step follows so that embodiments of the invention and architecture can be viewed with the appropriate perspective:

In STEP 1, the workflow may begin with a host being rebooted.

In STEP 2, depending on host configuration, one or more host NICs may attempt to DHCP as part of the BIOS boot workflow.

In STEP 3, if DHCP succeeds (the normal outcome), the NIC may begin the PXE boot workflow and the main workflow proceeds to STEP 4. If DHCP fails, the BIOS may continue the boot workflow and proceed to attempting to boot off of the local disk(s) in STEP 9. (This may or may not succeed depending on whether the local disk(s) have been previously provisioned successfully).

In STEP 4, the PXE protocol may be engaged within the NIC firmware which culminates with a bootable PXE image being delivered via the network.

In STEP 5, if PXE succeeds (the normal outcome), the BIOS may begin execution within the downloaded PXE image at STEP 6. If PXE fails, the BIOS may continue the boot workflow and proceeds to attempting to boot off of the local disk(s) in STEP 9. (This may or may not succeed depending on whether the local disk(s) have been previously provisioned successfully).

In STEP 6, the PXE image may provide server maintenance capabilities and may be in charge of determining whether the host needs to be kick-started or not.

In STEP 7, if the PXE image decides that the host needs to be kick-started (either because it is new, or is being re-provisioned), the workflow may proceed to kick-start in STEP 8. If kick-starting is not required, the workflow may proceed to booting from local disk(s) in STEP 9.

In STEP 8, the kick-start process may partition the local disk(s) and lays down the base OS image.

In STEP 9, during local boot, the host may boot off of the boot disk(s).

In STEP 10, an external configuration management service may run during the host boot process to force the machine into the appropriate service specific configuration (e.g., "Puppet hammer").

In STEP 11, at this stage the host may begin service (possibly after additional service specific deployment actions that require human intervention).

It should be appreciated that during an incident, DHCP and PXE may not be required for the datacenter to return to normal operation. Hosts are provisioned with static IP addresses bound to a TOR port. Thus, both DHCP and PXE can fail and the host will boot from local disk(s) and work normally. (Both DHCP and PXE may be required for successful provisioning).

Figure 7:
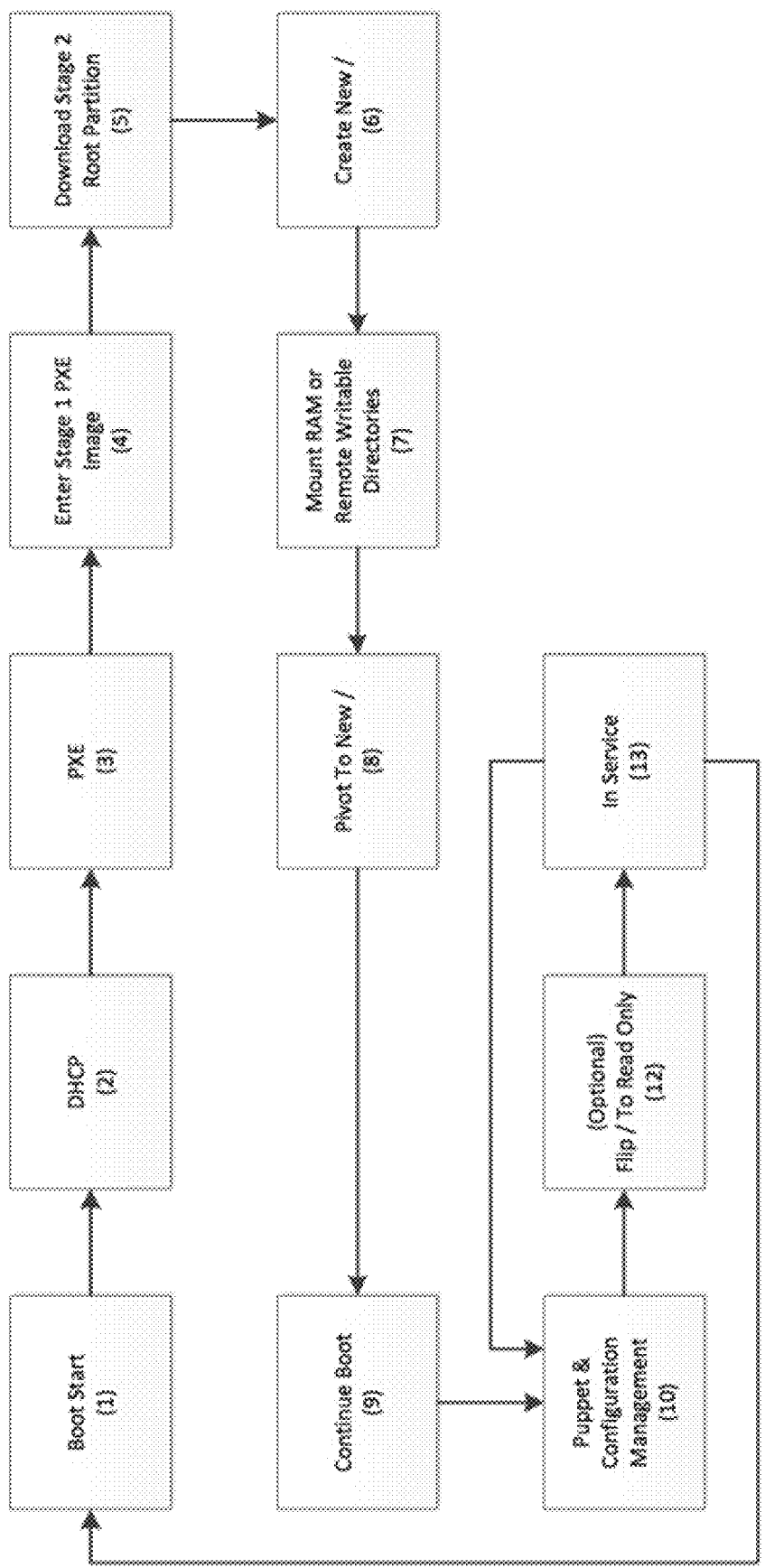
FIG. 7 shows a boot and provisioning process, according to embodiments of the present invention.

FIG. 7 shows a boot and provisioning process, according to embodiments of the present invention. A brief discussion of each step follows prior to sections containing detailed notes for each component:

In STEP 1, the workflow may begin with a host being rebooted.

In STEP 2, depending on host configuration, one or more host NICs may attempt to DHCP as part of the BIOS boot workflow. DHCP may require to complete for successful booting and the host to become functional. A fault tolerant and scalable DHCP solution may be required.

In STEP 3, the PXE protocol may be engaged within the NIC firmware which culminates with a bootable PXE image being delivered via the network. In one or more embodiments, a stage 1 PXE image is provided for every supported running kernel. It may include a kernel that the host is to be running (including drivers) and/or custom code that is operable to instruct how to download the correct stage 2 root partition, potentially via non-traditional protocols such as bit torrent. In one or more embodiments, PXE may be required to complete for successful booting and the host to become functional. A fault tolerant and scalable PXE solution may be required.

In STEP 4, the BIOS may begin execution of the downloaded stage 1 PXE image. At this point the host may be running the correct kernel version as specified by an external service.

In STEP 5, the stage 1 PXE image may include code to communicate with one or more external services (e.g., image storage services) to determine the appropriate stage 2 root partition that should be downloaded into RAM. In order to handle scalability during an incident, a bit torrent like protocol will need to be used so that stage 2 root partition download can be fanned out across the network fabric.

In STEP 6. The stage 1 PXE image proceeds to mount the downloaded root partition read/write using a RAM backed file system.

In STEP 7. Depending on the needs of the host, read/write partitions for writable directories (e.g., /var, /var/log, /tmp, etc.) are either mounted in RAM, or over network attached storage (see later in the document for a detailed discussion of why we hope to not have to implement a network attached storage solution).

In STEP 8. Stage 1 PXE image initialization completes by pivoting to the newly created root partition VFS hierarchy and then continuing with standard system initialization. (This is no different to how the kernel typically boots off of local disk where the initial RAM file system ("initramfs") is used before pivoting to the root partition which is also contained on local disk(s)).

In STEP 9. Standard system boot proceeds.

In STEP 10. While the root partition is still fully read/write, an external configuration management service may be engaged so that the host can be brought fully up to date and prepared for service ("hammered").

In STEP 11, in one or more embodiments of the invention, if the service/host owner has prepared for it, the majority of the root partition (other than the permanently writable directories) is flipped to read only. This prevents accidental anti-entropy and increases security.

In STEP 12, the host may begin service. If the service/host owner has opted to flip the root partition to read only, one way to enact further configuration changes may be to reboot the host. Otherwise, the host can continue standard operation via regular external configuration management service runs.

DHCP

Unlike a traditional boot process, DHCP may be required to succeed for a host to successfully enter service. Thus the DHCP service may be required to have the following properties: Be fault tolerant to a high degree (e.g., redundant PSUs, PDUs, and networking), be scalable (in order to survive an incident in which an entire datacenter availability zone loses power and restarts), hosts may be required to be able to gracefully back off and retry DHCP during boot (this may require BIOS customizations).

It should be appreciated that some DHCP solutions are stateless and thus highly scalable, so it should be tractable to meet such requirements with intelligent network fabric and datacenter design (e.g., ensuring that option DHCP broadcasts can reach redundant server hardware).

PXE

Unlike a traditional boot process, PXE may be required to succeed if a host is to successfully enter service. The PXE implementation may be required to share the same properties presented above for the DHCP implementation (fault tolerance, scalability, and graceful back off and retry). Unlike a boot process where a stock PXE image is delivered in order to prepare the host for maintenance, kick-start, or local boot, the delivered PXE image may have been pre-created for the host and customized with the kernel that the host is to be running.

Because in one or more embodiments, PXE images may be delivered over HTTP (using gPXE, iPXE, etc.), standard HTTP scale out and fault tolerance mitigation techniques can be applied to PXE reliability. The PXE solution may also be relatively stateless and simply translates a host IP address to the appropriate PXE image via an external service lookup. Accordingly, such an external service may be required to maintain the same fault tolerance and scalability requirements as the other components in the system.

Stage 1 PXE Image

Figure 8:
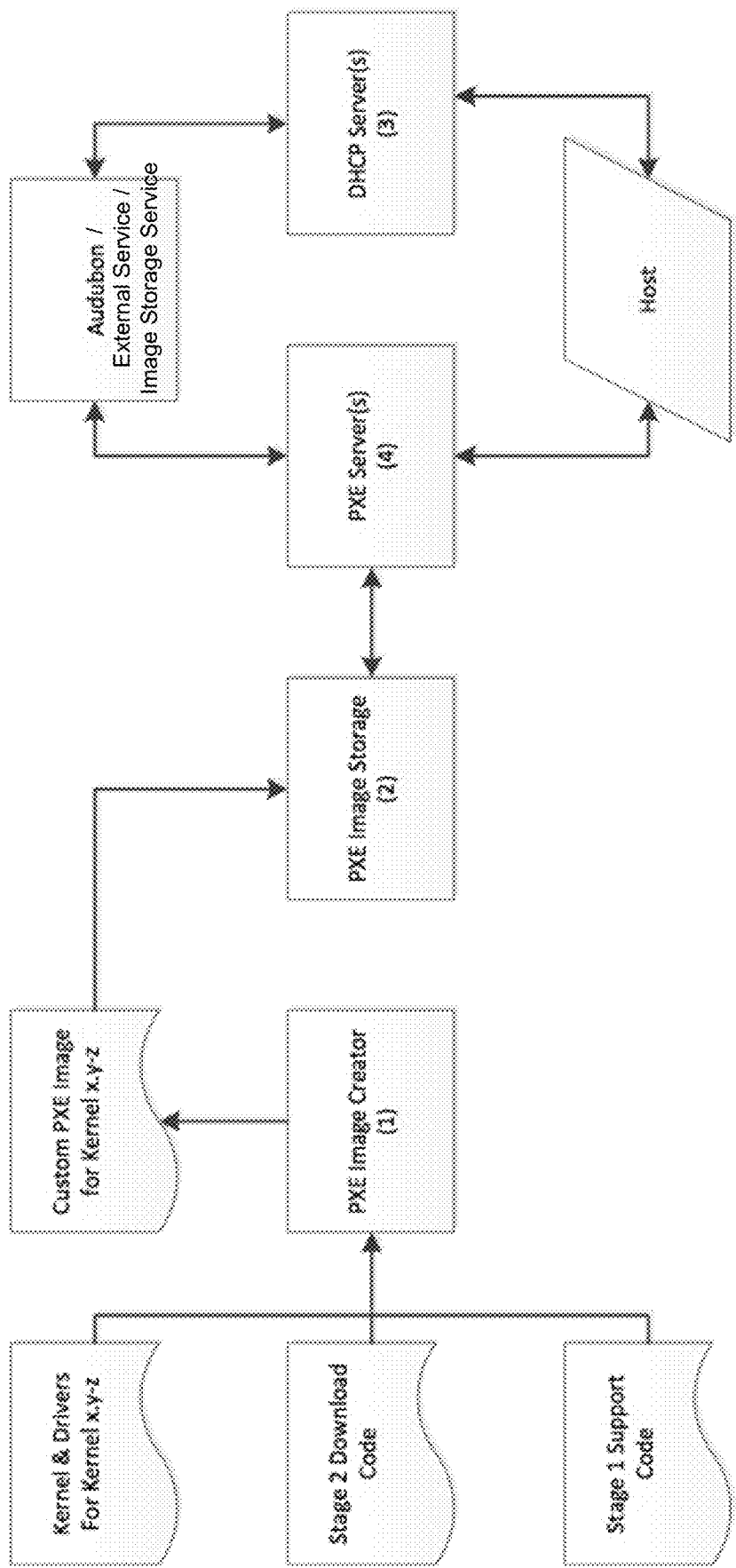
FIG. 8 shows a workflow for creation and delivery of a stage 1 PXE image, according to embodiments of the present invention.

FIG. 8 a workflow for creation and delivery of a stage 1 PXE image, according to embodiments of the present invention.

In STEP 1, a PXE image creator is an automated system that generates a bootable PXE image from several subcomponents: the kernel and drivers for a specific kernel x.y-z, code that is operable to instruct how to download the stage 2 root partition via a distributed download protocol such as bit torrent, stage 1 support code common to all PXE images such as the boot menu, maintenance services, etc. (this code may be provided by various teams within the company such as fleet management, provisioning engineering, etc.).

In STEP 2, the output of STEP 1 may be a bootable PXE image specific to kernel x.y-z. This image may be sent to the PXE image storage service and registered for future delivery.

In STEP 3, as described in the process overview, hosts may begin boot by receiving an IP address over DHCP. The DHCP server integrates with an external service if necessary in order to provide the appropriate IP address based on the origination source port.

In STEP 4, after DHCP, the host may begin the PXE boot process, and ultimately requests a bootable PXE image from the target PXE server. On the backend, the PXE server may use the host IP information (since this may be all that is available to it) to lookup the target kernel version in the external service). The PXE sever may then select the appropriate PXE image previously generated in STEP 1. At this point the host downloads the stage 1 PXE image and proceeds to boot from it.

Stage 2 Root Partition

The stage 2 root partition may include the primary OS image including basic distribution fundamentals (core utilities, etc.) and any specific customizations that apply to one, some, or all systems and are to be included in the base image. There may be several different available base images for different configurations such as CentOS 5, CentOS 6, etc.

FIG. 4 shows a procedure by which stage 2 root partition images may be created and delivered to a booting host, according to embodiments of the present invention.

In STEP 1, the stage 2 root partition creation engine may build root partition images for various configurations. This process is discussed in more detail in the following section. Root partition images may be seeded to torrent seed servers as well as registered with the root partition torrent selection engine.

In STEP 2, during stage 1 PXE image initialization on the host, the host may communicate with the stage 2 root partition torrent selection engine in STEP 3 to select the correct torrent to download based on external service attributes specified for the host.

In STEP 3, the stage 2 root partition torrent selection engine may provide the torrent address and the host proceeds to download the torrent into RAM. Image data may come from one more seed servers and one or more peers in order to scale during large reboot events.

Image Creation & Contents

In one or more embodiments of the invention, the size of the root image is shrunk down so as to fit in a smaller amount of RAM. In one example, 4 GB of RAM is allocated to the OS root partition image. However, over time this additional extra RAM is wasted for files that will never be used and the overall RAM budget for files stored in the root image may be decreased. Additionally, the extra cost of RAM (at the time of this writing approximately $7 per GB) used for holding the root partition may need to be subtracted from the cost savings of removing the boot disk(s)—the smaller the root image the greater the overall cost savings.

Because of the desire for additional cost reduction, over time the RAM budget for the root partition should be gradually shrunk from 4 GB to under 2 GB for the OS and applications. Additional shrinking techniques such as using a compressed root file system image, compiling code with –Os, etc. may be implemented as part of the image creation effort.

Bit Torrent (or Similar) Delivery

Figure 9:
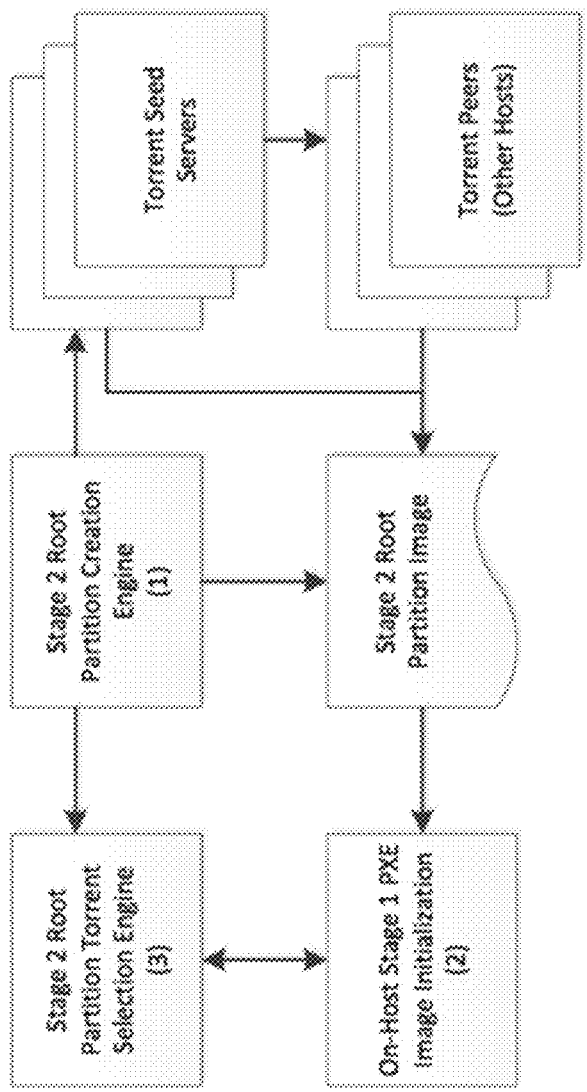
FIG. 9 shows a procedure by which stage 2 root partition images may be created and delivered to a booting host, according to embodiments of the present invention.

As described with reference to FIG. 9, in one or more embodiments of the invention a full deployment it may be necessary for the stage 2 root partition image to be downloaded by a distributed protocol such as bit torrent. The reason for this is that there may not be a way of building a scalable image distribution system that can hold up in the face of an incident. In one or more embodiments of the invention, a deployment can download the image directly without requiring the distributed download protocol to be in place.

Creating the New Root

Once the stage 2 root partition image is downloaded by the stage 1 PXE image, it may be mounted using a RAM backed file system (e.g., tmpfs) in preparation for pivoting to a new VFS root. Note that the downloaded root partition image may lack permanently writable directories such as /var, /var/log, and /tmp. This aspect of the root file system is covered in the following section.

Writable Root Partition Directories (/var, /var/log, /tmp, Etc.)

In one or more embodiments, a platform that emulates, simulates, or behaves similarly to the legacy environment with ample space available on the boot disk(s) may be provided.

Post Boot Configuration

External Configuration Management Service

A network booted machine may ultimately provide equivalent functionality to one booted using traditional methods. This means that everything done as part of kick-start as well as post kick-start configuration (e.g., "Puppet hammer") may need to be accomplished during every reboot. There are essentially two major approaches of accomplishing this (with a large number of possible variations):

1. Pre-create per-role stage 2 root partition images ahead of time and deploy the right image based on external service attributes during stage 1 PXE image initialization. After deployment, a small amount of host specific configuration would be applied and the machine would enter service.

2. Deploy a base OS image as the stage 2 root partition (nearly identical to what would be installed as part of kick-start), and then during every boot fully apply the role and host specific configurations (e.g., "Puppet hammer," etc.).

Approach (1) would allow for much faster boot times since the great majority of the image would be pre-created. In approach (2), very little would change from how things are done traditionally. First the base image is "kick-started" during stage 1 and stage 2 network boot, and then the role and host specific configuration is laid on top using an external configuration management service and more specifically "Puppet hammer."

Flipping Root to Read Only

After post boot configuration is complete, the option will exist to transition the primary root partition (or portions of it) RAM backed file system to read only. This has the benefit of greatly reducing the chance for accidental anti-entropy. However the benefits to security and correctness are high enough that a general push towards most service owners adopting this paradigm over time is expected.

While the various steps in the flowcharts of FIGS. 6-9 are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIGS. 6-9 should not be construed as limiting the scope of the invention. Rather, it will be apparent to persons skilled in the relevant art(s) from the teachings provided herein that other functional flows are within the scope and spirit of the present invention.

Figure 10:
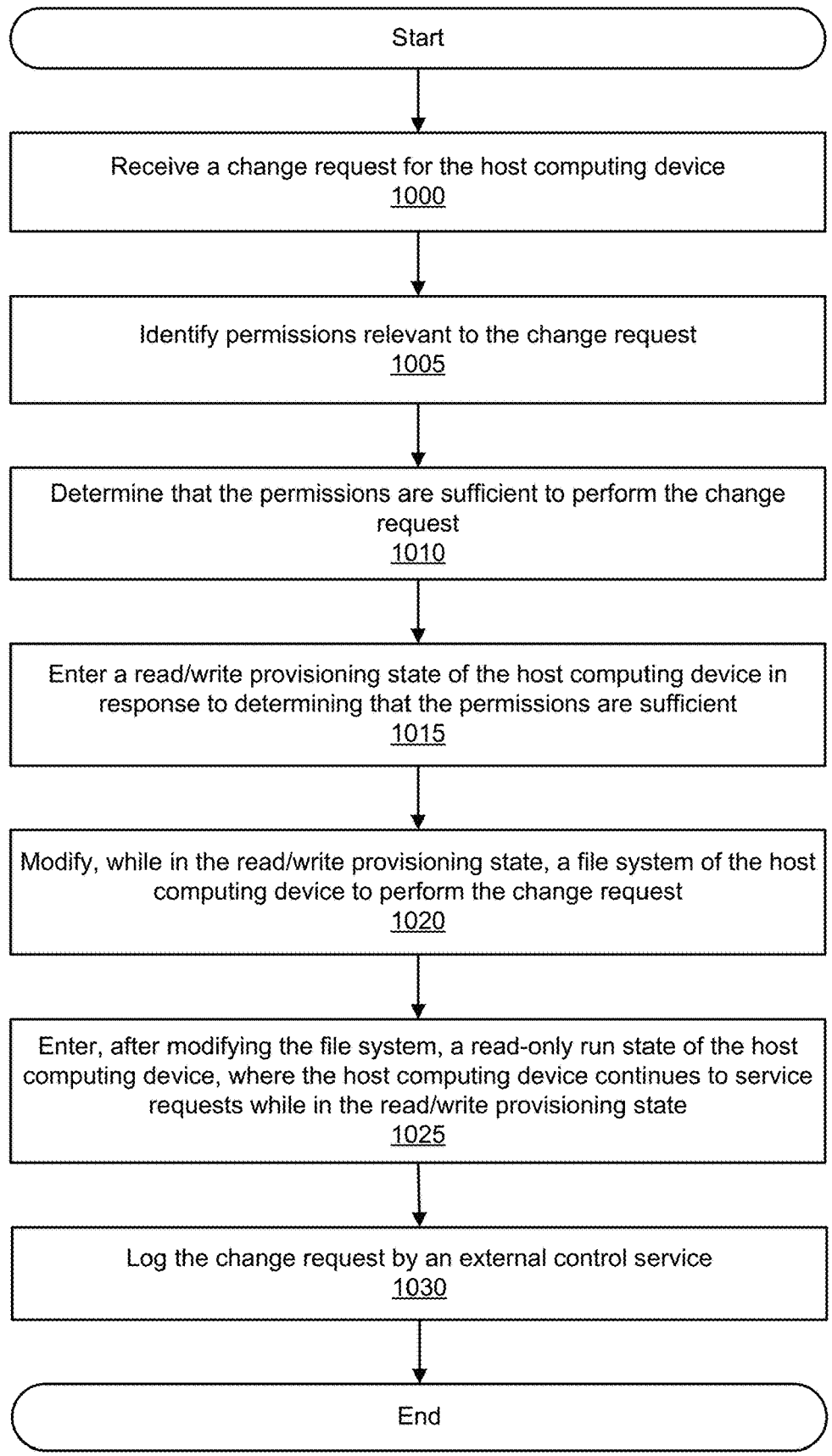
FIG. 10 shows a flowchart in accordance with one or more embodiments of the invention.

FIG. 10 shows a flowchart of a method for performing configuration changes in a host computing device. In one or more embodiments, the flowchart of FIG. 10 depicts example functionality of the computing device of FIG. 2B. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 10 should not be construed as limiting the scope of the invention.

In STEP 1000, a change request for the host computing device is received.

In STEP 1005, permissions relevant to the change request are identified.

In STEP 1010, that the permissions are sufficient to perform the change request is determined.

In STEP 1015, a read/write provisioning state of the host computing device is entered in response to determining that the permissions are sufficient.

In STEP 1020, modifying, while in the read/write provisioning state, a file system of the host computing device to perform the change request.

In STEP 1025, after modifying the file system, a read-only run state of the host computing device is entered, where the host computing device continues to service requests while in the read/write provisioning state.

In STEP 1030, the change request is logged by an external control service.

Figure 11:
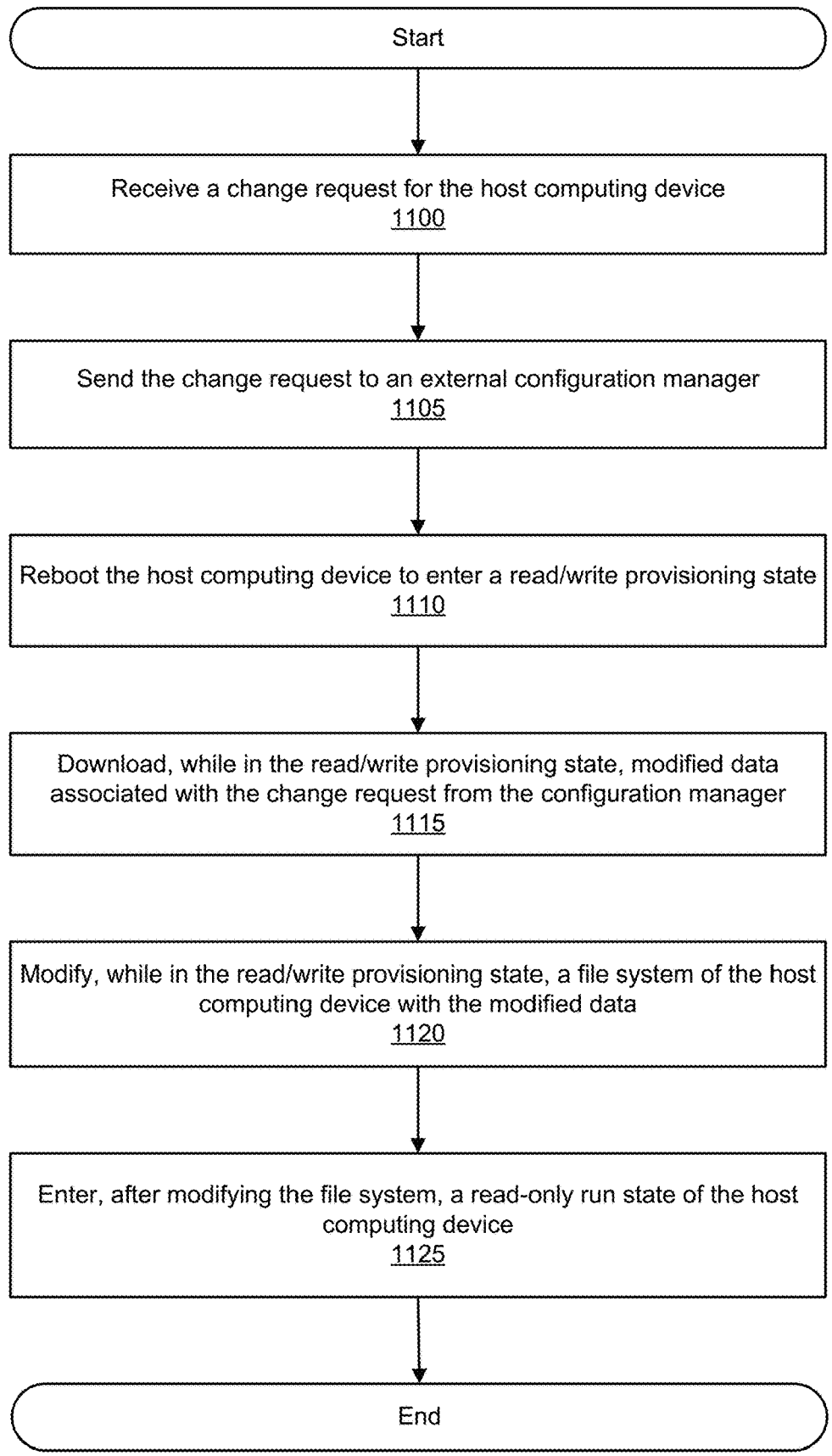
FIG. 11 shows a flowchart in accordance with one or more embodiments of the invention.

FIG. 11 shows a flowchart of a method for performing configuration changes in a host computing device. In one or more embodiments, the flowchart of FIG. 9 depicts example functionality of the computing device of FIG. 5A. While the various steps in this flowchart are presented and described sequentially, one of ordinary skill will appreciate that some or all of the steps can be executed in different orders and some or all of the steps can be executed in parallel. Further, in one or more embodiments of the invention, one or more of the steps described below can be omitted, repeated, and/or performed in a different order. Accordingly, the specific arrangement of steps shown in FIG. 11 should not be construed as limiting the scope of the invention.

In STEP 1100, a change request for the host computing device is received.

In STEP 1105, the change request is sent to an external configuration manager.

In STEP 1110, the host computing device is rebooted to enter a read/write provisioning state.

In STEP 1115, while in the read/write provisioning state, modified data associated with the change request is downloaded from the configuration manager.

In STEP 1120, while in the read/write provisioning state, a file system of the host computing device is modified with the modified data.

In STEP 1125, after modifying the file system, a read-only run state of the host computing device is entered.

Figure 12:
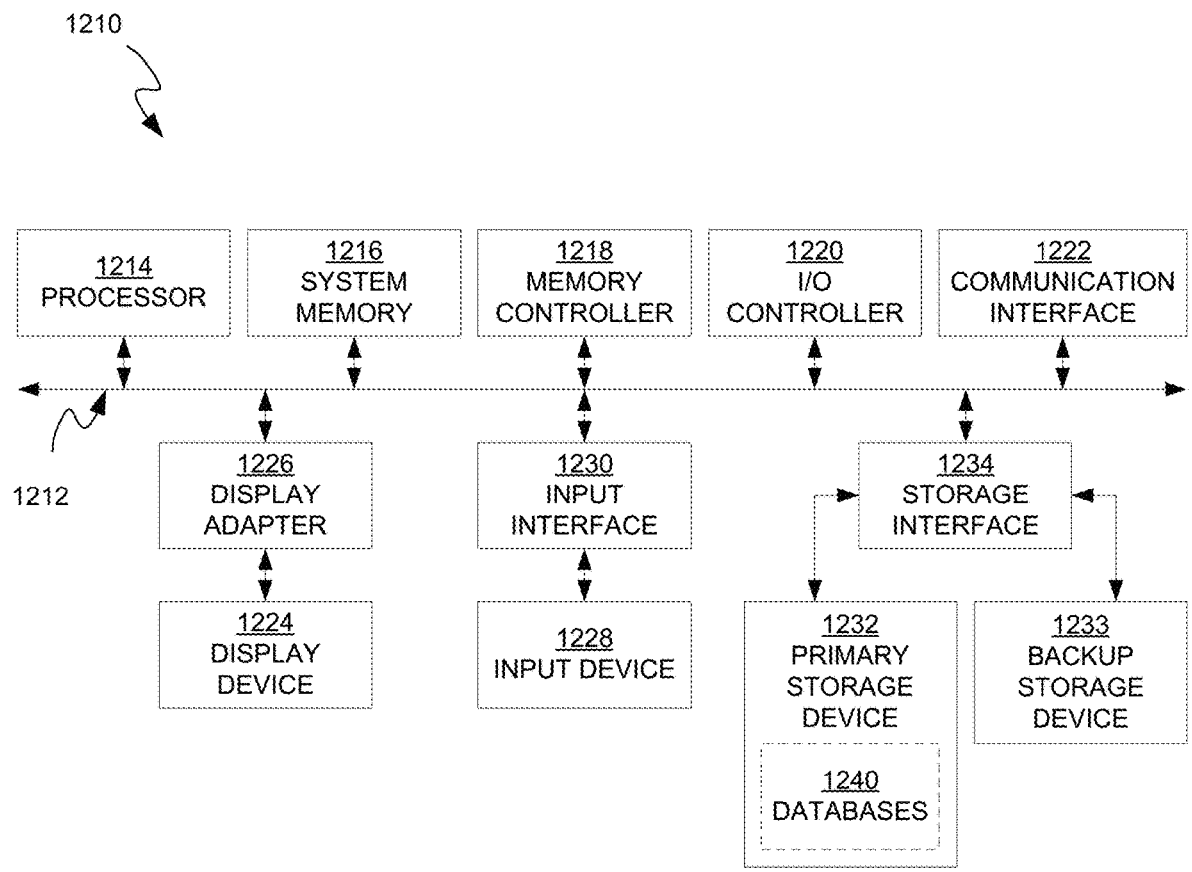
FIG. 12 is a block diagram of a computing system, in accordance with embodiments of the invention.

FIG. 12 is a block diagram of an example of a computing system 1210 capable of implementing embodiments of the present disclosure. Computing system 1210 broadly represents any single or multi-processor computing device or system capable of executing computer-readable instructions. Examples of computing system 1210 include, without limitation, workstations, laptops, client-side terminals, servers, distributed computing systems, handheld devices, or any other computing system or device. In its most basic configuration, computing system 1210 may include at least one processor 1214 and a system memory 1216.

Processor 1214 generally represents any type or form of processing unit capable of processing data or interpreting and executing instructions. In certain embodiments, processor 1214 may receive instructions from a software application or module. These instructions may cause processor 1214 to perform the functions of one or more of the example embodiments described and/or illustrated herein.

System memory 1216 generally represents any type or form of volatile or non-volatile storage device or medium capable of storing data and/or other computer-readable instructions. Examples of system memory 1216 include, without limitation, RAM, ROM, flash memory, or any other suitable memory device. Although not required, in certain embodiments computing system 1210 may include both a volatile memory unit (such as, for example, system memory 1216) and a non-volatile storage device (such as, for example, primary storage device 1232).

Computing system 1210 may also include one or more components or elements in addition to processor 1214 and system memory 1216. For example, in the embodiment of FIG. 12, computing system 1210 includes a memory controller 1218, an input/output (I/O) controller 1220, and a communication interface 1222, each of which may be interconnected via a communication infrastructure 1212.

Communication infrastructure 1212 generally represents any type or form of infrastructure capable of facilitating communication between one or more components of a computing device. Examples of communication infrastructure 1212 include, without limitation, a communication bus (such as an Industry Standard Architecture (ISA), Peripheral Component Interconnect (PCI), PCI Express (PCIe), or similar bus) and a network.

Memory controller 1218 generally represents any type or form of device capable of handling memory or data or controlling communication between one or more components of computing system 1210. For example, memory controller 1218 may control communication between processor 1214, system memory 1216, and I/O controller 1220 via communication infrastructure 1212.

I/O controller 1220 generally represents any type or form of module capable of coordinating and/or controlling the input and output functions of a computing device. For example, I/O controller 1220 may control or facilitate transfer of data between one or more elements of computing system 1210, such as processor 1214, system memory 1216, communication interface 1222, display adapter 1226, input interface 1230, and storage interface 1234.

Communication interface 1222 broadly represents any type or form of communication device or adapter capable of facilitating communication between example computing system 1210 and one or more additional devices. For example, communication interface 1222 may facilitate communication between computing system 1210 and a private or public network including additional computing systems. Examples of communication interface 1222 include, without limitation, a wired network interface (such as a network interface card), a wireless network interface (such as a wireless network interface card), a modem, and any other suitable interface. In one embodiment, communication interface 1222 provides a direct connection to a remote server via a direct link to a network, such as the Internet. Communication interface 1222 may also indirectly provide such a connection through any other suitable connection.

Communication interface 1222 may also represent a host adapter configured to facilitate communication between computing system 1210 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 1222 may also allow computing system 1210 to engage in distributed or remote computing. For example, communication interface 1222 may receive instructions from a remote device or send instructions to a remote device for execution.

As illustrated in FIG. 12, computing system 1210 may also include at least one display device 1224 coupled to communication infrastructure 612 via a display adapter 1226. Display device 1224 generally represents any type or form of device capable of visually displaying information forwarded by display adapter 1226. Similarly, display adapter 1226 generally represents any type or form of device configured to forward graphics, text, and other data for display on display device 1224.

As illustrated in FIG. 12, computing system 1210 may also include at least one input device 1228 coupled to communication infrastructure 1212 via an input interface 1230. Input device 1228 generally represents any type or form of input device capable of providing input, either computer- or human-generated, to computing system 1210. Examples of input device 1228 include, without limitation, a keyboard, a pointing device, a speech recognition device, or any other input device.

As illustrated in FIG. 12, computing system 1210 may also include a primary storage device 1232 and a backup storage device 1233 coupled to communication infrastructure 1212 via a storage interface 1234. Storage devices 1232 and 1233 generally represent any type or form of storage device or medium capable of storing data and/or other computer-readable instructions. For example, storage devices 1232 and 1233 may be a magnetic disk drive (e.g., a so-called hard drive), a floppy disk drive, a magnetic tape drive, an optical disk drive, a flash drive, or the like. Storage interface 1234 generally represents any type or form of interface or device for transferring data between storage devices 1232 and 1233 and other components of computing system 1210.

In one example, databases 1240 may be stored in primary storage device 1232. Databases 1240 may represent portions of a single database or computing device or it may represent multiple databases or computing devices. For example, databases 1240 may represent (be stored on) a portion of computing system 610 and/or portions of example network architecture 1300 in FIG. 713(below). Alternatively, databases 1240 may represent (be stored on) one or more physically separate devices capable of being accessed by a computing device, such as computing system 1210 and/or portions of network architecture 1300.

Continuing with reference to FIG. 12, storage devices 1232 and 1233 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1232 and 1233 may also include other similar structures or devices for allowing computer software, data, or other computer-readable instructions to be loaded into computing system 1210. For example, storage devices 1232 and 1233 may be configured to read and write software, data, or other computer-readable information. Storage devices 1232 and 1233 may also be a part of computing system 610 or may be separate devices accessed through other interface systems.

Many other devices or subsystems may be connected to computing system 1210. Conversely, all of the components and devices illustrated in FIG. 12 need not be present to practice the embodiments described herein. The devices and subsystems referenced above may also be interconnected in different ways from that shown in FIG. 12. Computing system 1210 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 1210. All or a portion of the computer program stored on the computer-readable medium may then be stored in system memory 1216 and/or various portions of storage devices 1232 and 1233. When executed by processor 1214, a computer program loaded into computing system 1210 may cause processor 1214 to perform and/or be a means for performing the functions of the example embodiments described and/or illustrated herein. Additionally or alternatively, the example embodiments described and/or illustrated herein may be implemented in firmware and/or hardware.

Figure 13:
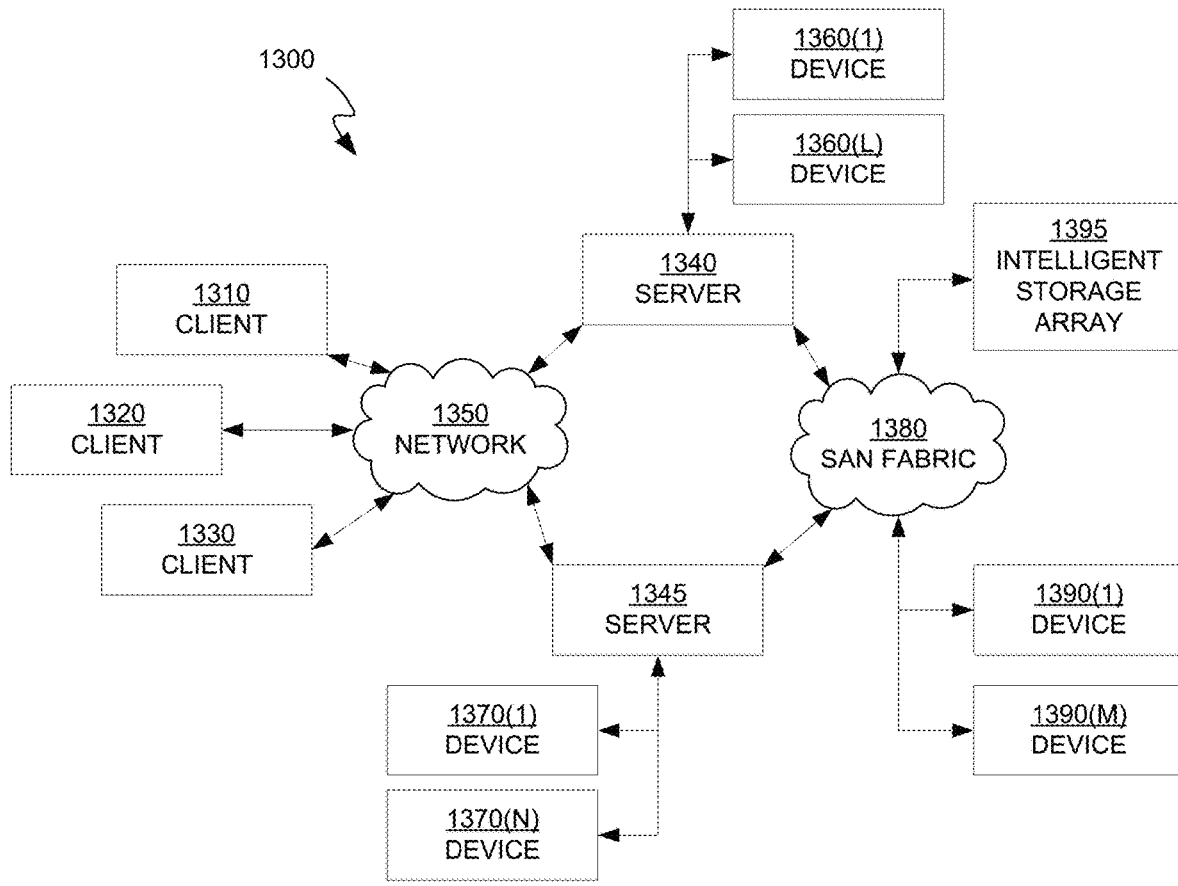
FIG. 13 is a block diagram of an example of a network architecture in which servers and client systems may be coupled to a network, according to embodiments of the invention.

FIG. 13 is a block diagram of an example of a network architecture 1300 in which client systems 1310, 1320, and 1330 and servers 1340 and 1345 may be coupled to a network 1350. Client systems 1310, 1320, and 1330 generally represent any type or form of computing device or system, such as computing system 1310 of FIG. 12.

Similarly, servers 1340 and 1345 generally represent computing devices or systems, such as application servers or database servers, configured to provide various database services and/or run certain software applications. Network 1350 generally represents any telecommunication or computer network including, for example, an intranet, a wide area network (WAN), a local area network (LAN), a personal area network (PAN), or the Internet.

With reference to computing system 1210 of FIG. 12, a communication interface, such as communication interface 1222, may be used to provide connectivity between each client system 131310, 131320, and 131330 and network 1350. Client systems 1310, 1320, and 1330 may be able to access information on server 1340 or 1345 using, for example, a Web browser or other client software. Such software may allow client systems 1310, 1320, and 1330 to access data hosted by server 1340, server 1345, storage devices 1360(1)-(L), storage devices 13130(1)-(N), storage devices 1390(1)-(M), or intelligent storage array 1395. Although FIG. 13 depicts the use of a network (such as the Internet) for exchanging data, the embodiments described herein are not limited to the Internet or any particular network-based environment.

In one embodiment, all or a portion of one or more of the example embodiments disclosed herein are encoded as a computer program and loaded onto and executed by server 1340, server 1345, storage devices 1360(1)-(L), storage devices 13130(1)-(N), storage devices 1390(1)-(M), intelligent storage array 1395, or any combination thereof. All or a portion of one or more of the example embodiments disclosed herein may also be encoded as a computer program, stored in server 1340, run by server 1345, and distributed to client systems 1310, 1320, and 1330 over network 1350.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of booting a computing device over a network, the method comprising:
   receiving a request to install a boot image on the computing device;
   determining a target portion of a file system of the computing device affected by the request to install the boot image;
   logically partitioning the file system into a first partition and a second partition, wherein the first partition comprises the target portion and the second partition comprises the file system other than the first partition;
   provisioning the first partition of the file system to operate in a read/write state, wherein the request is executed to install the boot image while the first partition is operating in the read/write state;
   determining whether the boot image was successfully installed on the computing device; and
   in response to determining that the boot image was successfully installed on the computing device, provisioning the first partition to operate in a read-only state.

2. The method of claim 1, wherein the request is received from the computing device after the computing device has been rebooted.

3. The method of claim 1,
   wherein the computing device has a previously-installed boot image installed in the first partition of the file system, and
   wherein the boot image is installed such that the previously-installed boot image is overwritten.

4. The method of claim 3, further comprising:
   determining that the boot image was not successfully installed on the computing device, and
   in response to determining that the boot image was not successfully installed on the computing device, transmitting, to the computing device, a boot command including instructions to boot from the previously-installed boot image.

5. The method of claim 1, wherein provisioning the first partition of the file system of the computing device to operate in the read/write state comprises:
transmitting, to the computing device, an installation command including instructions to provision the first partition to operate in the read/write state.

6. The method of claim 1, further comprising:
while the first partition is provisioned in the read/write state, transmitting one or more parameter values each corresponding to a respective configuration option for the boot image; and
wherein the request is executed to install the boot image (i) while the first partition is operating in the read/write state and (ii) according to the one or more parameter values.

7. The method of claim 1, wherein provisioning the first partition of the file system to operate in the read-only state comprises:
transmitting, to the computing device, a cold-boot provisioning command, wherein the cold-boot provisioning command causes the computing device to reboot.

8. A system comprising:
one or more computers and one or more storage devices on which are stored instructions that are operable, when executed by the one or more computers, to cause the one or more computers to perform operations for booting a computing device over a network, the operations comprising:
receiving a request to install a boot image on the computing device;
determining a target portion of a file system of the computing device affected by the request to install the boot image;
logically partitioning the file system into a first partition and a second partition, wherein the first partition comprises the target portion and the second partition comprises the file system other than the first partition;
provisioning the first partition of the file system to operate in a read/write state, wherein the request is executed to install the boot image while the first partition is operating in the read/write state;
determining whether the boot image was successfully installed on the computing device; and
in response to determining that the boot image was successfully installed on the computing device, provisioning the first partition to operate in a read-only state.

9. The system of claim 8, wherein the request is received from the computing device after the computing device has been rebooted.

10. The system of claim 8,
wherein the computing device has a previously-installed boot image installed in the first partition of the file system, and
wherein the boot image is installed such that the previously-installed boot image is overwritten.

11. The system of claim 10, wherein the operations further comprise:
determining that the boot image was not successfully installed on the computing device, and
in response to determining that the boot image was not successfully installed on the computing device, transmitting, to the computing device, a boot command including instructions to boot from the previously-installed boot image.

12. The system of claim 8, wherein provisioning the first partition of the file system of the computing device to operate in the read/write state comprises:
transmitting, to the computing device, an installation command including instructions to provision the first partition to operate in the read/write state.

13. The system of claim 8, wherein the operations further comprise:
while the first partition is provisioned in the read/write state, transmitting one or more parameter values each corresponding to a respective configuration option for the boot image; and
wherein the request is executed to install the boot image (i) while the first partition is operating in the read/write state and (ii) according to the one or more parameter values.

14. The system of claim 8, wherein provisioning the first partition of the file system to operate in the read-only state comprises:
transmitting, to the computing device, a cold-boot provisioning command, wherein the cold-boot provisioning command causes the computing device to reboot.

15. One or more non-transitory computer-readable storage media encoded with instructions that, when executed by one or more computers, cause the one or more computers to perform operations for booting a computing device over a network, the operations comprising:
receiving a request to install a boot image on the computing device;
determining a target portion of a file system of the computing device affected by the request to install the boot image;
logically partitioning the file system into a first partition and a second partition, wherein the first partition comprises the target portion and the second partition comprises the file system other than the first partition;
provisioning the first partition of the file system to operate in a read/write state, wherein the request is executed to install the boot image while the first partition is operating in the read/write state;
determining whether the boot image was successfully installed on the computing device; and
in response to determining that the boot image was successfully installed on the computing device, provisioning the first partition to operate in a read-only state.

16. The computer-readable media of claim 15, wherein the request is received from the computing device after the computing device has been rebooted.

17. The computer-readable media of claim 15,
wherein the computing device has a previously-installed boot image installed in the first partition of the file system, and
wherein the boot image is installed such that the previously-installed boot image is overwritten.

18. The computer-readable media of claim 17, wherein the operations further comprise:
determining that the boot image was not successfully installed on the computing device, and
in response to determining that the boot image was not successfully installed on the computing device, transmitting, to the computing device, a boot command including instructions to boot from the previously-installed boot image.

19. The computer-readable media of claim 15, wherein provisioning the first partition of the file computer-readable media of the computing device to operate in the read/write state comprises:

transmitting, to the computing device, an installation command including instructions to provision the first partition to operate in the read/write state.

20. The computer-readable media of claim 15, wherein the operations further comprise:

while the first partition is provisioned in the read/write state, transmitting one or more parameter values each corresponding to a respective configuration option for the boot image; and wherein the request is executed to install the boot image (i) while the first partition is operating in the read/write state and (ii) according to the one or more parameter values.

21. The computer-readable media of claim 15, wherein provisioning the first partition of the file computer-readable media to operate in the read-only state comprises:

transmitting, to the computing device, a cold-boot provisioning command, wherein the cold-boot provisioning command causes the computing device to reboot.

* * * * *